UNITED STATES PATENT OFFICE 1,922,882

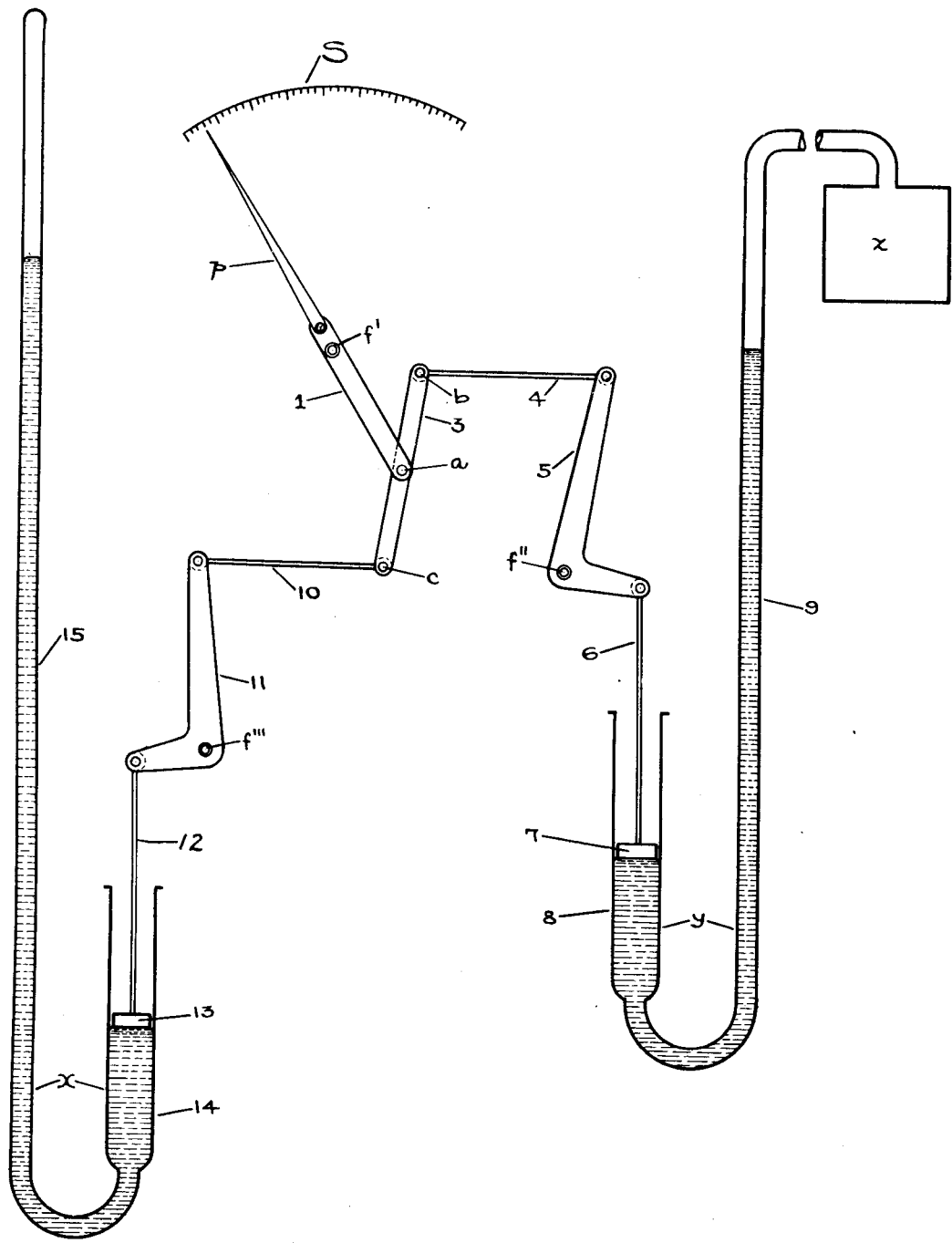

ABSOLUTE PRESSURE RECORDING DEVICE

Victor M. Chatfield, Philadelphia, Pa., assignor to Sun Oil Company, Philadelphia, Pa., a Corporation of New Jersey Application July 11, 1931. Serial No. 550,115

3 Claims. (Cl. 73—31)

Many present day processes are carried out under a regulated degree of vacuum, or more strictly speaking, under a regulated sub-atmospheric pressure. In some instances it is necessary to keep such pressures within closely regulated limits, as a slight increase or decrease would materially affect the product produced. With existing instruments for measuring or recording absolute pressures below atmospheric, it is necessary to take the pressure reading and then make a correction on that reading to bring it to a standard temperature and to sea level barometric pressure, which are 0° C and 760 mm. of mercury respectively.

This proceeding is naturally unhandy and consumes time, but above all it admits a great possibility of error. In view of the foregoing, I have designed the apparatus disclosed herein, the object of which is to measure and record absolute pressures and at the same time automatically, by the same instrument, compensate for the necessary temperature and barometric corrections so that the final reading is given in N. T. P. (the "normal" temperature and pressure above specified).

In the accompanying drawing I have illustrated diagrammatically one form which my invention may take.

In the drawing, S designates a scale calibrated in mm. of mercury. Cooperating with the scale is the pointer 1, pivoted at the fixed point $f'$. At the point "$a$" on the pointer is pivoted an equalizing link 3, the point "$a$" bi-secting this link. To one end "$b$" of the link, another link 4 is pivoted. This link in turn is pivotally connected to one arm of the bell crank 5. The bell crank is pivoted at the fixed point $f''$, and the other end is pivotally connected to the link 6. This link rests upon a float 7, which is supported on the mercury in the leg 8 of the U-tube "$y$". The other leg 9 of the U-tube is open to the vessel "$z$", in which pressure is to be measured. To the other end "$c$" of the equalizing link is pivoted a link 10, the other end of which is pivotally connected to one leg of the bell crank 11. This bell crank is pivoted at the fixed point $f'''$. The other arm of the bell crank is connected to the link 12, which rests upon the float 13. This float is carried by the mercury in the leg 14 of the barometer "$x$", the leg 15 being sealed.

From the foregoing, it is apparent that any drop in pressure within the vessel "$z$" will cause a rise of the mercury in the column 9 of the U-tube "$y$" and a consequent drop of the mercury in column 8. This drop or motion is transmitted through the elements 6, 5, and 4 to the equalizing link, moving the point "$b$" to the right. If the point "$c$" of the equalizing link remains substantially stationary, this motion will be transmitted to the pointer 1, and indicated on the scale S. Considering now that there is a change in barometric pressure, this change will affect the mercury in both the barometer "$x$" and the U-tube "$y$" raising or lowering the mercury an equal amount in both tubes. If, for instance, we get a drop in barometric pressure, the mercury in tubes 14 and 8 will rise. The motion will be transmitted through the linkages on both the barometric and the U-tube side of the equalizing link, and move the points "$c$" and "$b$" respectively an equal amount, thereby turning the link about point "$a$" as its center. It is readily seen that this movement will in no way affect the reading shown by the pointer on scale S.

It is to be understood that the elements 4 and 10, 5 and 11, 6 and 12 are equal in length, and made of the same material. This will cause any temperature change to expand or contract both sets of linkages an equal amount and thereby move points "$b$" and "$c$" of the equalizing link an equal amount without moving the point "$a$" to the right or left and therefore without changing the reading on the scale S. The tubes constituting the barometer "$x$" and the U-tube "$y$" are of the same size, and contain the same amount of mercury, so that any change in temperature will affect both equally.

From the foregoing it is apparent that any change in atmospheric pressure or any change in atmospheric temperature will cause the equalizing link 3 to move about "$a$" as its center without moving the pointer 1. However, if a change in pressure occurs in the vessel "$z$", the link 3 will move about "$c$" as it center, and move the pointer an amount corresponding to the change in the pressure in vessel "$z$".

When the instrument is first set up, it may be set to N. T. P. (normal temperature and pressure) in several different ways. The following, however, is a procedure which is easily carried out. The vessel "$z$" is placed under any known sub-atmospheric pressure. This pressure would then show on the scale S without any temperature or barometric corrections. The pressure within "$z$" is then corrected to N. T. P., and the pointer 1 is set to the corrected figure on the scale. This may be accomplished by moving either of the tubes "$x$" or "$y$" up or down until the pointer is at the desired spot, or the part "p" of the pointer may be adjustable with respect to the part 1, and the setting made in this way. When the instrument is once set at N. T. P., the readings will not deviate as already explained.

It is to be further understood that while I have shown a simple scale and pointer, these indicating means may be replaced by any known recording means such as a traveling tape calibrated with pressure measurements, or a rotating card, such as employed in many present day instruments.

While I have shown only one method of transmitting motion from the tubes "x" and "y" to the indicating means, it is apparent that there are other modes of conveying this motion, and of equalizing any motion caused by the changes in atmospheric pressure and temperature, and it is to be understood that I do not wish to be limited by the means shown.

I claim:

1. A device for measuring absolute pressure comprising: a mercury barometer; a U-tube containing mercury being responsive on one side to atmospheric pressure and on the other side to the pressure to be measured; an indicator having indicia thereon; a pointer for cooperation with the indicator having a fixed pivot; an equalizing link pivotally connected between its ends to the pointer; linkage between one end of said equalizing link and the mercury barometer; and linkage interposed between the equalizing link and the atmospheric side of said U-tube; said barometer linkage, said U-tube linkage and said equalizing link being so substantially homologous that any change in atmospheric pressure will swing the equalizing link about its connection to the pointer without moving the pointer but whereby any change in the pressure to be measured will swing the equalizing link about its pivoted connection to the barometer linkage and thereby move the pivoted connection between the pointer and the equalizing link and change the position of the pointer relative to the indicator.

2. A device for measuring absolute pressure comprising: an indicator having indicia thereon; a pointer for cooperation with the indicator having a fixed pivot; an equalizing link pivotally connected to said pointer at a point removed from its fixed pivot; a mercury barometer; a float on the atmospheric side of said barometer, a fixedly pivoted bell crank and two links connecting opposite ends of the bell crank to the float and to the equalizing link respectively; a mercury-containing U-tube responsive to the pressure being measured and atmospheric pressure; a float on the mercury in the atmospheric side of the U-tube; a fixedly pivoted bell crank and two links connecting opposite ends of the bell crank to the float and to the equalizing link respectively; said barometer, said barometer linkage, said U-tube, said U-tube linkage and said equalizing link being equally proportioned so that any change in atmospheric temperature or pressure will equally move both ends of the equalizing link, thereby turning it on its pivoted connection to the pointer without moving the pointer but that any change in the pressure to be measured will move the U-tube linkage but not the barometer linkage, thereby holding the pivoted connection between the barometer linkage and the equalizing link substantially stationary and swinging the equalizing link about that connection to move the pointer.

3. In a device for measuring absolute pressure the combination including a fixedly pivoted pointer, an equalizing link pivoted between its ends to one end of the pointer, a barometer, a pressure responsive device subject to the pressure to be measured and to atmospheric pressure, mechanism operably connected to the barometer and one end of the equalizing link, similar mechanism operably connected to the atmospheric side of said pressure responsive device and the other end of said equalizing link, both of said mechanisms being operated by a change in atmospheric pressure to rotate the equalizing link about its pivotal connection to the pointer without changing the position of the pointer but only the last mentioned mechanism being operated by a change in the pressure to be measured to swing the equalizing link about its pivotal connection to the first mentioned mechanism to thereby move the pointer.

VICTOR M. CHATFIELD.